Oct. 30, 1962 J. RAPISARDA 3,060,996
PROCESS OF AND MACHINE FOR MAKING PACKAGE
Filed April 25, 1960 6 Sheets-Sheet 1
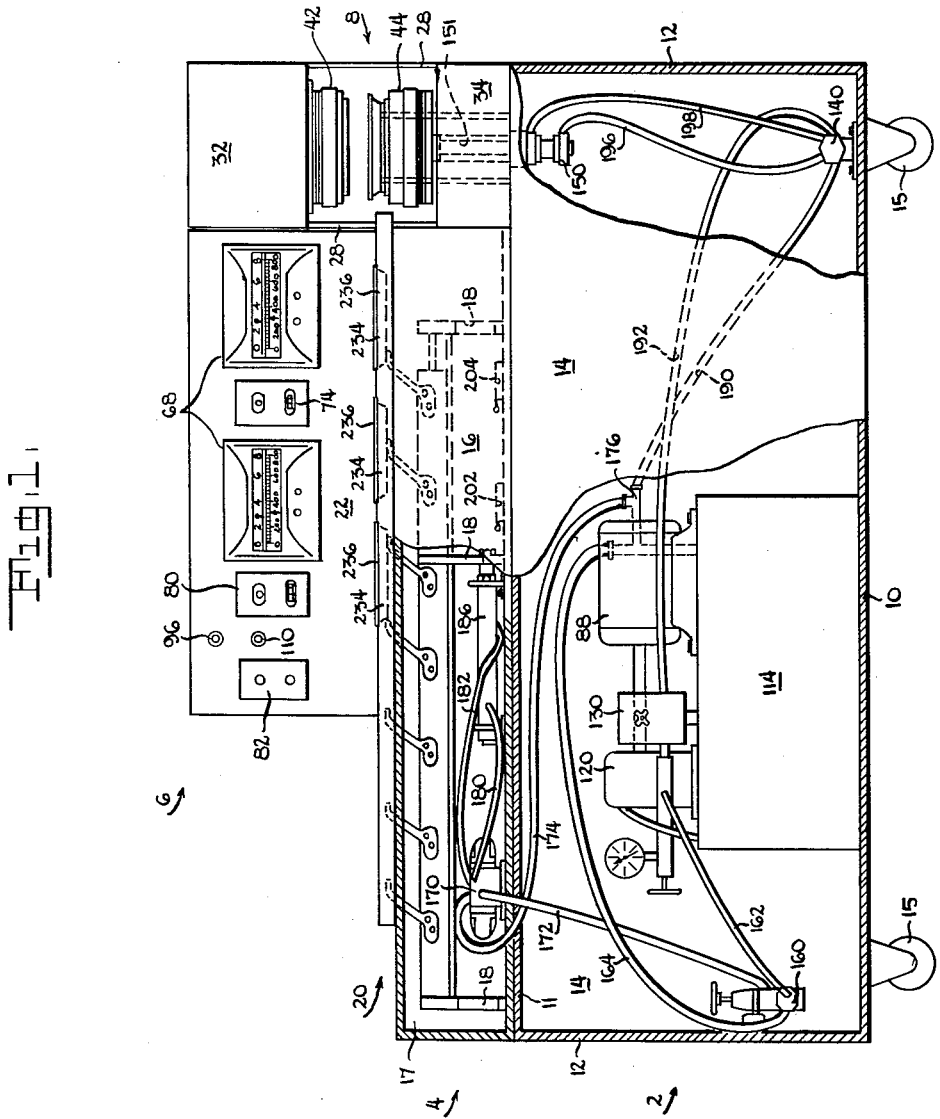
INVENTOR.
JORDAN RAPISARDA
BY Kenwood Ross
ATTORNEY Oct. 30, 1962 J. RAPISARDA 3,060,996
PROCESS OF AND MACHINE FOR MAKING PACKAGE
Filed April 25, 1960 6 Sheets-Sheet 2
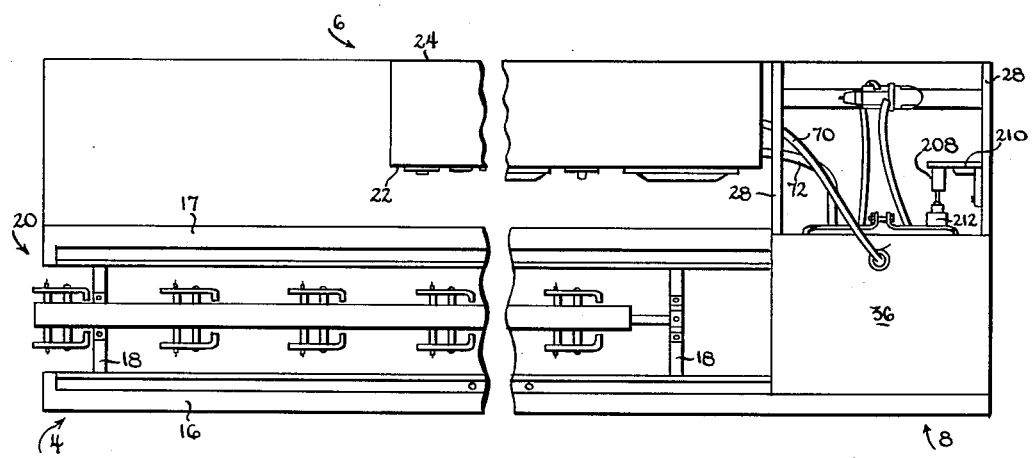
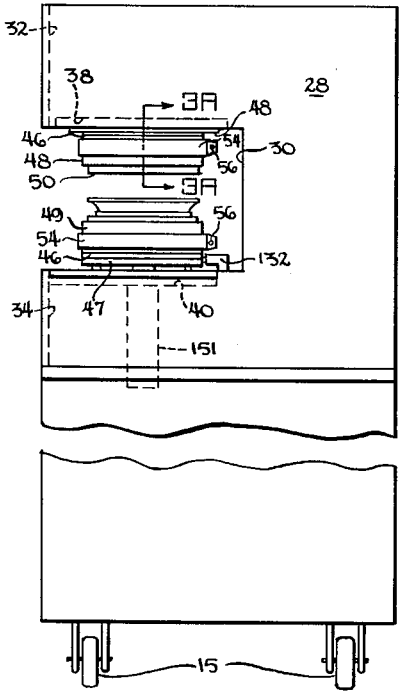
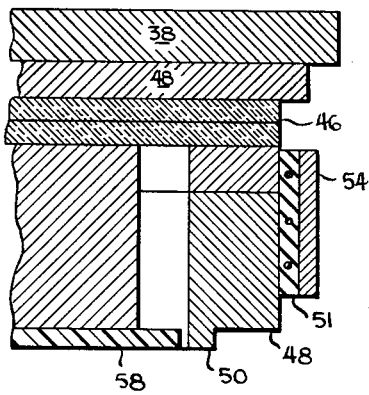
INVENTOR.
JORDAN RAPISARDA
BY Kenwood Ross
ATTORNEY Oct. 30, 1962 J. RAPISARDA 3,060,996
PROCESS OF AND MACHINE FOR MAKING PACKAGE
Filed April 25, 1960 6 Sheets-Sheet 3
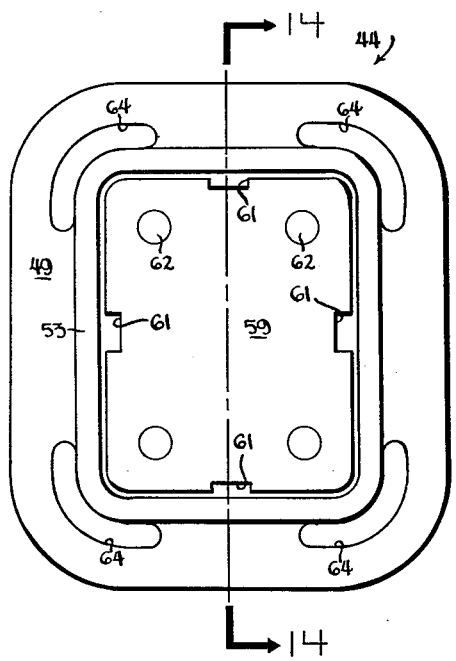
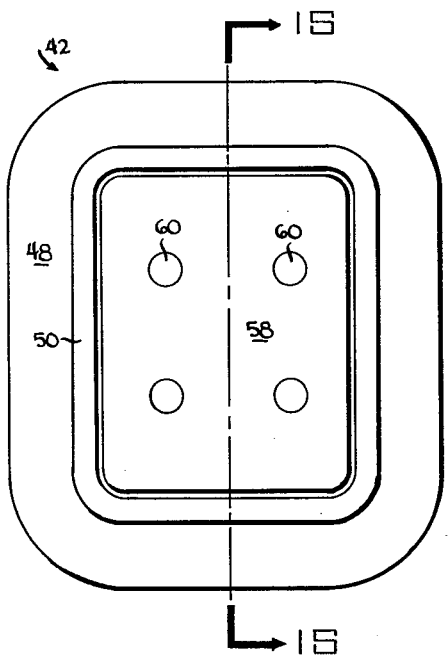
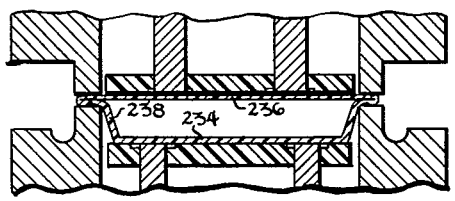
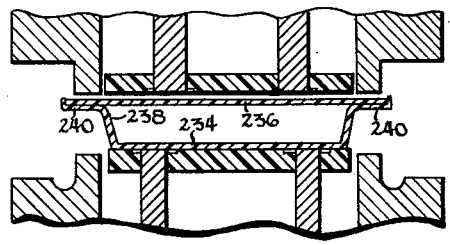
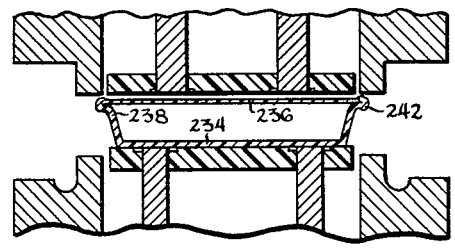
INVENTOR.
JORDAN RAPISARDA
BY *Kenwood Ross*
ATTORNEY Oct. 30, 1962 J. RAPISARDA 3,060,996
PROCESS OF AND MACHINE FOR MAKING PACKAGE
Filed April 25, 1960 6 Sheets-Sheet 4
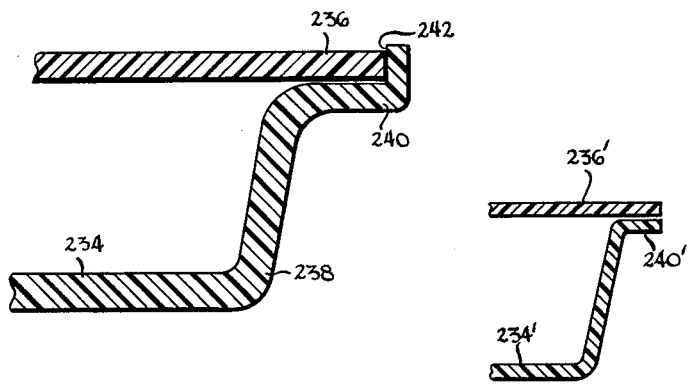
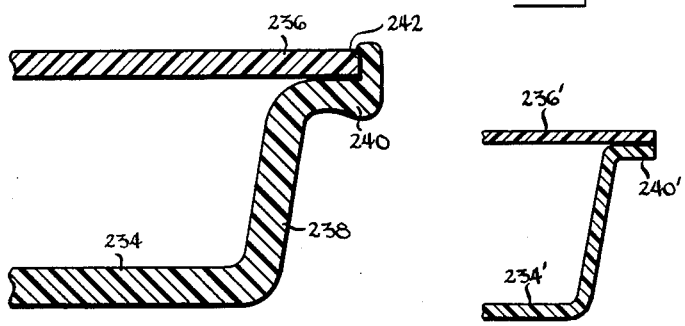
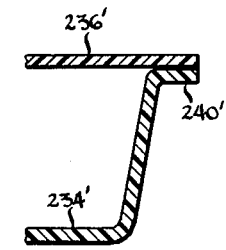
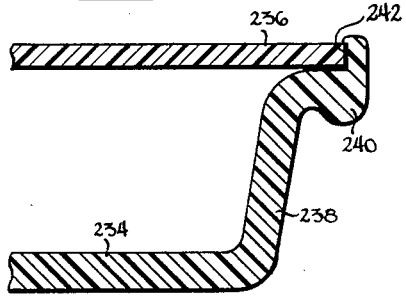
*INVENTOR.*
JORDAN RAPISARDA
BY Kenwood Ross
ATTORNEY Oct. 30, 1962      J. RAPISARDA      3,060,996
PROCESS OF AND MACHINE FOR MAKING PACKAGE Filed April 25, 1960      6 Sheets-Sheet 5

INVENTOR.
JORDAN RAPISARDA
BY Kenward Ross
ATTORNEY

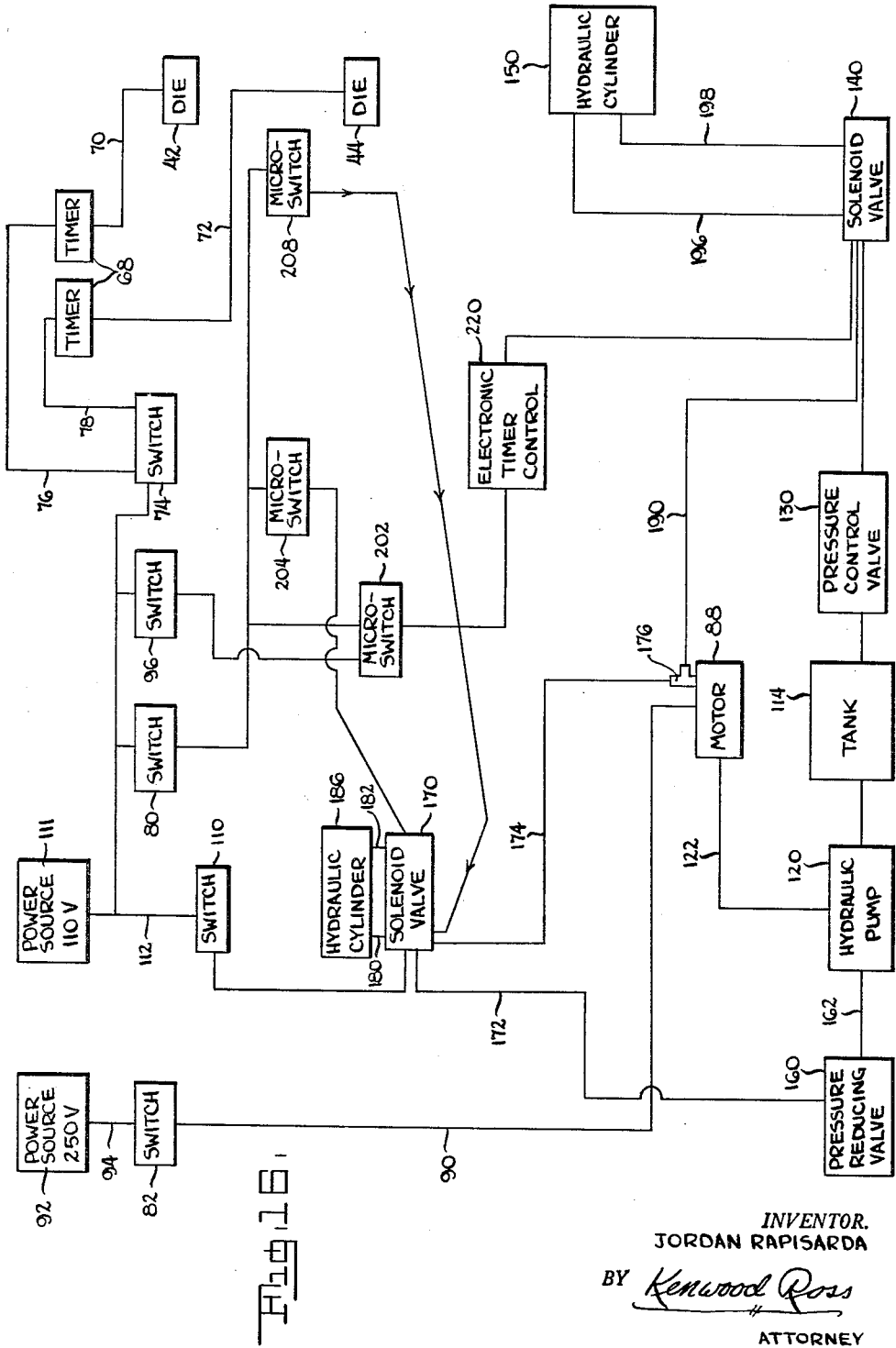

3,060,996
PROCESS OF AND MACHINE FOR MAKING PACKAGE
Jordan Rapisarda, 57 Amostown Road, West Springfield, Mass.
Filed Apr. 25, 1960, Ser. No. 24,549
1 Claim. (Cl. 156—583)

This invention relates to new and useful improvements in structural refinements in plastic heat seals and more particularly to a method of and apparatus for heat sealing preformed plastic containers and covers and is directed more particularly to packages of synthetic thermoplastic material and methods of and means for heat sealing the same.

The invention resides in the particular construction, arrangement, combination, and relationship of the various elements, components and instrumentalities of the heat sealing apparatus and the system of its use, as exemplified in the detailed disclosure hereinafter set forth, wherein the objects of the invention, as defined in the paragraphs below, will be apparent.

Thermoplastic sheet material is highly favored for many uses in the packaging industry, including the packaging of food, in which applications the transparency of the sheet and its ability to preserve the freshness of the contents are important considerations.

In the past, seals between containers and covers therefor have been easily rupturable so as to reflect adversely upon the bonding action therebetween as a result of the heating sealing. Stated otherwise, prior art efforts to heat seal in manner to provide a nonrupturable bond have been generally unsuccessful so as to render unsatisfactory the packaging of food or other contents.

It is the principal object of the present invention to provide a system of sealing which recognizes that the maintenance of the factors of heat and pressure alone will not insure proper and adequate sealing and that the time of dwell is an equally critical factor which must be subjected to control.

It is another salient object hereof to provide an apparatus which facilitates the maintenance of the delicate balance between the pressure and heat and dwell factors, and particularly the heat and dwell factors, and still further, to provide means whereby the control of the time element in the dwell is independently controlled to minute degrees. That is to say, heretofore, as the factor of pressure has been increased, it has been found necessary to decrease the factor of dwell time, said factors being so interrelated. It has been determined that, by the independent control of the dwell to almost infinite degrees, the sealing of practically any type of commercially available plastic film or sheet material is facilitated.

As a further refinement, I provide an inventively novel and improved construction of the package sealing type adapted for rapid sealing of packages formed from plastic, said construction being arranged to apply heat and pressure by means of a pair of vertically movable dies to overlapping portions of heat sealable material, with the material being heated to a plastic state and forcibly welded together in such manner that the overlapping portions are sealed at the proper zone against moisture escape or infiltration to conform to very rigid tolerances and specifications.

Another object is to provide a thermoplastic package in which the cover is secured to the container by the heat sealing process, with the cover being easily removable from the container by reason of an initial rupture of the cover and a subsequent easy tearing thereof adjacent the heat sealed bond or weld without any rupture of the bond or weld per se.

Another object hereof is to provide a sealing system which takes advantage of the desirable effects that I have discovered as advantageous in producing moisture-proof barriers in the sealing of packages formed from the material herein delineated.

It is another object hereof to provide a sealed package which will be impervious to air and which may serve to maintain a variety of foods in a fresh, edible condition.

Still another object is to provide a method or process for sealing covers on containers which is simple so as to effectively reduce the costs presently experienced with processes of container sealing.

Another object is to provide a sealing means whereby the factors of temperature, dwell time and pressure are synchronized with each other and are readily adjustable as to each other, i.e. by increasing or decreasing the pressure, by increasing or decreasing the operating temperature, and by increasing or decreasing the dwell time, in manner as not to disturb the phased relationships of such factors.

It will be understood that the container used herewith will be preformed as by vacuum-forming or pressure-forming, same not forming a part of this invention.

The thermoplastic resin material contemplated for use in the machine hereof and according to the system hereof may be of the dimensionally unstable type wherein the capability of shrinking may be stronger than the force or pressure applied thereto or it may be of the dimensionally stable type where no shrinkage is involved.

Examples of the types of thermoplastic resins envisioned for use herein include polyethylene, polystyrene, polyvinyl chloride, polyvinyl acetate, polyvinyl alcohol, polyvinyl chloride acetate copolymer, cellulose acetate, cellulose nitrate, polyvinylidene chloride, and combinations of the above with a non-sealable material as for instance, an extruded coating of polyethylene on paper. Such list is intended to be illustrative and is not exhaustive of the types of thermoplastic resin which may be used within the spirit and scope of this invention.

Preferentially, the plastic material employed will be a biaxially oriented polystyrene sheet having attributes of increased mechanical strength and toughness. As is known, orientation implies a process of stretching the material in manner so as to line up the molecular chains in a predetermined direction. Once lined up, the ordered arrangement is frozen in a strained condition. Orientation being a molecular rearrangement only, the directional properties are primarily affected, the bulk properties remaining relatively unchanged, all suited for the specific employment contemplated herein.

As is also known, a shortcoming of oriented thermoplastic sheet or film is the elastic memory imparted to the material by orientation. During orientation, the material is stretched, then cooled or frozen in the stretched state. Thus the material has high internal stresses which tend to pull it back to its original shape. If the material is related to the orientation temperature, it tends to revert to its original size. Capital is made of this specific characteristic in the invention hereof.

These objects and other incidental ends and advantages reasonably appearing, some of which will in part be obvious and apparent and some of which will in part be more fully pointed out in the progress of the disclosure, it will be explained that the invention consists substantially in the combination, construction, location and relative arrangement of parts, as described in detail hereinafter, as shown in the annexed drawings, and as defined with particularity in the appended claims forming a part hereof.

There is illustrated one form of physical embodiment of the invention capable of carrying the same into practical operation, it being understood that the elements therein exhibited may be varied or changed as to shape, proportion and precise manner of assemblage without departing from the spirit of the invention. That is, it is to be particularly understood that this invention is not limited to the structural details or arrangement of parts here shown since a construction embodying said invention may take various forms, it being susceptible of various modifications and alternative constructions. Said physical embodiment delineated is only indicative of but one of the various ways, albeit the preferred exemplification, in which the principles of the invention may be employed and in which the component parts may be combined and arranged. Same is submitted as one best known embodiment of the invention in accordance with the patent statutes and is given with a view to illustrating and explaining the precise nature of the principles of the invention and their embodiment for practical use, in order that others skilled in the art may be enabled to adapt and modify them in numerous embodiments, variations and modifications, each as may be best adapted to the conditions of any particular use.

In the drawings:

FIG. 1 is a front elevational view of the apparatus of the invention hereof with portions of the front cover plates being broken away for purposes of clarity;

FIG. 2 is a broken top plan view of the apparatus shown in FIG. 1;

FIG. 3 is a broken end elevational view of the apparatus, at the sealing or right hand end thereof as viewed in FIG. 1;

FIG. 3A is a fragmentary sectional view through the upper die component and upper die support plate;

FIG. 4 is a top plan view of the upper surface of the lower die component of the sealing means of the apparatus of FIG. 1;

FIG. 5 is an inverted plan view of the lower surface of the upper die component of the sealing means of the apparatus of FIG. 1;

FIGS. 6, 7 and 8 are fragmentary sectional views showing a container and related cover disposed between the upper and lower die components of the sealing means before the sealing process has commenced, as the sealing process ensues, and following completion of the sealing process respectively;

FIGS. 9, 10 and 11 are enlarged fragmentary sectional views of a container and related cover prior to, during and following sealing respectively;

FIGS. 12 and 13 are fragmentary sectional views of a container and related cover of a modified type prior to and following sealing respectively;

FIG. 16 is a schematic drawing illustrating the movement control means of the apparatus of the invention and the interrelationship of the various components.

Figure 14:
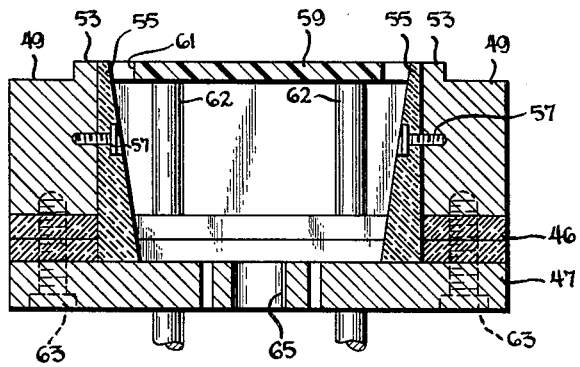
FIG. 14 is a sectional view on the line 14—14 of FIG. 4.

With continued reference to the drawings, which illustrate a typical and preferred embodiment of the invention for the purpose of disclosure and forms a part of this specification, I have shown an apparatus comprising essentially a base generally indicated by 2 upon which a table generally indicated by 4 may be located forwardly of a control panel generally indicated by 6 also located upon base 2 and adjacent a sealing unit generally indicated by 8 and likewise located upon base 2, all to the end that the general relationship of the various components may be better understood.

Base 2 will be observed to be generally rectangular in shape and to comprise a pair of parallel laterally-extending bottom rails 10 connected together and held in spaced relationship to each other as by transverse rails (not shown) of usual construction.

Similar parallel laterally extending upper rails 11 are held in spaced relationship above the bottom rails 10 by means of upwardly-extending vertical uprights 12 which are fixed to bottom and upper rails 10 and 11 respectively at their points of jointure as is conventional.

Base 2, so formed, may be enclosed as by vertically extending panels, such as 14, to enclose and conceal certain of the operating instrumentalities hereinafter to be described, access thereto being gained through appropriately located doors (not shown) in said panels.

If desired, casters 15 may be located beneath base 2 in conventional manner to facilitate movement of the apparatus from place to place.

Table 4 is disposed upon the upper planar surface of base 2, being fixed thereto and extending upwardly therefrom. Same is substantially rectangular in shape and of somewhat smaller width and length than the respective measurements of base 2 and is positioned relative to said base at the forward side and left hand end thereof, as viewed in FIG. 1.

Table 4 comprises a pair of spaced, parallel, vertically-extending face members, identified as a forward face member 16 and a rearward face member 17, with forward face member 16 being positionable flush with the forwardly-disposed vertical panel of base 2.

Face members 16 and 17 are connected by a plurality of transversely-extending brace member 18 connecting therebetween at convenient locations.

A laterally-extending hitch-feed mechanism of any well-known type, generally designated by the numeral 20, is disposed between face plate 16 and 17 is fixed to and supported upwardly of the brace members 18. Same forms no part of the present invention and is illustrated only for purposes of delineating one means by which the containers and covers therefor may be introduced to the sealing means of the invention.

Control panel 6 is fixed to and extends upwardly from the upper planar surface of base 2 rearwardly of table 4. It is generally box-like in design and includes a forward vertically-extending panel 22, a rearward vertically-extending panel 24, and the usual end and top panels (not shown).

Rearward panel 24 is preferentially positionable flush with the rearwardly-disposed vertical panel 14 of base 2.

Sealing unit 8 is disposed above and fixed to base 2 adjacent the forward side and right-hand and thereof, as viewed in FIG. 1 and includes a housing comprising a pair of spaced parallel vertically-extending end walls 28 and 28, which are each provided with a forwardly-facing recess 30 intermediate the upper and lower edges thereof, as may be best observed by reference to FIG. 3.

Opposite end walls 28 are connected at their forward edges as by upper and lower transversely-extending forward members 32 and 34 respectively adjacent the upper and lower sides of the recesses.

If desired, the top of the housing or a portion thereof may be enclosed as by a top wall 36. See FIG. 2.

Horizontally-disposed upper and lower die support plates 38 and 40 respectively extend transversely between and are secured to end walls 28 at the upper and lower sides respectively of the recesses.

Upper and lower die components 42 and 44 respectively are carried by upper and lower die support plates 38 and 40 respectively.

Upper die component 42 depends downwardly from upper die support plate 38. Lower die component 44 is complemental in size and shape to upper die member 42 and extends upwardly from lower die support plate 40.

Said upper die component 42 may include one or more outermost or uppermost horizontally-disposed laminations of insulating material 46 formed from transite or the like and an innermost or uppermost metallic plate 48, all being secured to said upper die support plate 38.

Said lower die component 44 may include one or more outermost or lowermost horizontally-disposed laminations of insulating material 46, as aforesaid, secured to an outermost or lowermost metallic plate 47 and an innermost or uppermost metallic plate 49, all being secured to said lower die support.

In the case of each die component, a heating band 51 of any well known type such as may be formed from silicon rubber and incorporating electrical wires interiorly thereof may be enwrapped around the outer marginal wall of the respective plates 38 and 40.

Contrariwise, it is to be appreciated that each said plate 48 may be heated as by a cartridge insert or by induction heat.

Thin metallic shielding bands 54 of stainless steel or equivalent material may be enwrapped around the respective heating bands and secured to the respective die components as by bolts 56 or the like.

Extending downwardly from the inner surface of plate 48 and upwardly from the inner surface of plate 49 a raised rim 50 and 53 respectively may be provided which functions as the striking or pressing surface of the die component.

Platform members 58 and 59 respectively as shown in FIGS. 4 and 5 are disposed within the inset bounded by the raised edges 50 and 53 of the upper and lower plates 48 and 49 respectively and may be formed of fiberboard or equivalent material.

Platform member 58 of upper die component 42 is held in place by pin members 60.

Platform member 59 of lower die component 44 is held in place by alignment rods 62, which also function as alignment rods for said lower die component.

As illustrated in FIG. 4, elongated arcuate depressions or reliefs 64 are provided in the operating face of metallic plate 49 adjacent the corners of the raised edge or rim 53 which reliefs serve to facilitate a more even distribution of heat to the corners of the article to be sealed so as to prevent objectionable corner stress and resultant distortion through any concentration of heat thereat.

FIG. 14 is a sectional view of the lower die component 44 taken on the line 14—14 of FIG. 4.

It will be observed that the alignment rods 62 extend vertically downwardly through the entire thickness of the die member.

A pair of guide members 55 are centrally affixed to each of the innermost walls of the members 49 as by transvers bolts 57. The upper extremities of said guide members are receivable in slots 61 in platform member 59.

The metallic plate 57 is affixed to the die member 44 as by bolts 63 which extend upwardly through said metallic plate 47 and the insulating laminations 46.

A circular opening 65 is provided centrally of the metallic plate 47 which may receive the upper end of the piston rod 151 of the hydraulic cylinder 150.

Figure 15:
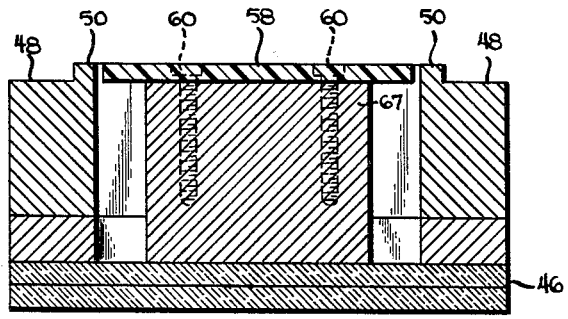
FIG. 15 is a sectional view on the line 15—15 of FIG. 5.

FIG. 15 is a sectional view of the uppermost die component 42 taken on the line 15—15 of FIG. 5.

A metallic block 67 of square configuration is disposed centrally of said die member 42. The plateform member 58 is affixed to the upper extremity of said block as by the downwardly extending bolts 60.

In control panel 6, a pair of temperature control timer devices 68 of known design are mounted, each being connected to one of the die components 42 and 44 as by connections 70 and 72 respectively and serving to control the temperature in one of the die components 42 and 44. Each may be preset to serve to maintain the temperature at its respective die component at any predetermined level.

A switch device 74 of known form and mounted in control panel 6 is connected to timers 68 and 68 as by connections 76 and 78. Same serves to energize the electrical circuits for producing the heat in the respective die components.

A switch device 80 also of known form and mounted in control panel 6 serves to energize the microswitches and solenoids, as will appear.

A switch device 82, of the start-stop button type and similarly mounted in control panel 6, serves as a start-stop switch and effectuates energization of the hydraulic pump motor 88, being connected thereto as by a connection 90 and being powered from a power source 92 through a connection 94.

A circuit interrupter switch 96 is mounted in control panel 6 and in open position, serves to interrupt the current delivered to all electrical components, in manner as to allow them to remain in phase and to bring the machine to a complete stop at a predetermined retracted position so that at no time is the sequare of operations ever destroyed.

A starter switch 110 is mounted in control panel 6 and serves to initiate the automatic cycling of the apparatus. Same is powered from power source 111 through connection 112.

A tank or reservoir 114 is mounted upon and within base 2 and may support hydraulic pump motor 88 mounted thereon. Motor 88 serves to operate an hydraulic pump 120 in known manner being connected thereto as by connection 122.

Pump 120 may also be supported above tank 144.

A pressure control valve 130 is disposed between hydraulic pump 120 and solenoid valve 140 for effectuating a control of the pressure delivered by said hydraulic pump to said solenoid valve and a hydraulic cylinder 150.

A pressure reducing valve 160 of known type is connected to hydraulic pump 120 as by a conduit 162.

A 4-way solenoid valve 170 of commercially available type is supported by base 2. Conduits 172 and 174 connect same to pressure reducing valve 160 and to a T-coupling 176 respectively. Said T-coupling 176 is connected to said tank 114.

Conduits 180 and 182 connect 4-way solenoid valve 170 to opposite ends of an hydraulic cylinder 186 carried by base 2.

A conduit 190 connects solenoid valve 140 with T-coupling 176 leading to tank 114. A conduit 192 connects solenoid valve 140 to hydraulic pump 120.

Solenoid valve 140 is also connected by conduits 196 and 198 to opposite ends of hydraulic cylinder 150 which actuates piston rod 151 therewithin, which rod is fixed to the lower die support plate of the lower die component 44 and supports same upwardly thereof.

Microswitches 202 and 204 are carried by table 4, one being arranged forwardly of the other. Same serve to effectuate the imparting of reciprocatory movements to hitch feed mechanism 20. Said microswitch 202 effectuates movement toward the die components and said microswitch 204 effectuates movement away therefrom.

A momentary contact microswitch 208 is located rearwardly of lower die component 44 and is fixed upon a bracket 210 secured to and extending inwardly from one of the end walls 28.

An L-shaped lug 212 projects outwardly from the rearward surface of the lower die component 44 and contacts micro-switch 208 as said lower die component is reciprocated downwardly.

An electronic dwell timer control device 220, graduated in increments of $1/3600$ of a minute, is preset to provide a predetermined length of dwell of the dies in the sealing position.

The presetting of the electronic dwell control device 220 determines the period of dwell of the dies.

The operating parts having been described, the operation of the mechanism will now be described.

Initially, switch device 74 is actuated to effectuate the energization of the electrical circuits for producing the desired heat in each of the die components through the respective temperature control devices 68, same having been preset according to the preliminarily determined limits in manner to achieve the desired degree of temperature in each of the respective die components.

In a specific sealing operation, it may be desirable that the heat of the lower die component be greater than, or identical with, or less than the heat of the upper die component, depending upon the thermoconductivity of the respective materials employed and/or the thickness thereof.

The desired temperature limit in each die component having been attained, hydraulic pump 120 may thereupon be achivated by the actuation of the start button of switch device 82.

Switch device 80 is thereafter actuated so as to effect energization of the micro-switches and solenoids of the apparatus.

With the energization of the electrical circuits, hydraulic pump motor 88 is activated for effectuating the actuation of hydraulic pump 120 to provide pressure through 4-way solenoid valves 170 and solenoid valve 140 to hydraulic cylinders 186 and 150 respectively.

Plastic containers 234 and covers 236 therefor are then placed in position upon hitch feed mechanism 20 preparatory to feeding in seriatim to sealing unit 8.

The reciprocal movement of the hitch feed mechanism relative to the sealing unit is achieved through the contact thereof with the microswitches 202 and 204 coacting with 4-way solenoid valve 170 and hydraulic cylinder 186.

Actuation of the hitch feed mechanism forwardly toward the sealing unit effectuates the passage of the containers 234 and covers 236 therefor in seriatim onto the platform of the lower die component 44.

Accordingly, said lower die component is moved toward said upper die component so as to move the contoured faces thereof into closing relation with portions of a container and related cover disposed therebetween in manner whereby through a combination of heat and pressure through a dwell time a sealing is effectuated.

As the sealing operation ensues, lower die component 44 is thereupon retracted downwardly and away from upper die component 42 in a retrograde movement in manner to cause lug 212 carried by said lower die component, to contact microswitch 208 and thereby effectuate a reversal of the circuit in preparation for the subsequent sealing cycle.

It is reiterated that the system hereof permits the independent control of the length of dwell time as will be observed by the following description of the sequence of steps in the operation of the apparatus.

The actuation of starter switch 110 energizes solenoid valve 170 which actuates the piston of hydraulic cylinder 186 to cause the piston to contact microswitch 204.

The drive is then reversed to micro-switch 202 which energizes dwell time control device 220 same having been preset.

The timer in turn energizes solenoid valve 140 which remains energized for an interval according to the predetermined setting of said dwell time control device.

When the time increment has elapsed, the deenergization of solenoid valve 140 is effectuated by the deenergization of the timer whereat the mechanical spring return incorporated in said solenoid valve effectuates the retraction of the lower die 44 to open position.

It is this retraction of the lower die which actuates microswitch 208.

In its return to open position, lug 212 contacts microswitch 208 which energizes solenoid 170 to impart a forward motion to piston of hydraulic cylinder 186 to complete the automatic cycle.

When interrupted by circuit interrupter switch 96, the circuit is deenergized at microswitch 202 thereby bringing the apparatus to a complete stop with the die and feed in the retracted position.

It is this independent control of the time element in which a predetermined contact pressure is maintained in relation to the predetermined heat setting and predetermined pressure setting which accomplishes any degree of heat seal required.

As shown in FIG. 6, the container 234 has upwardly extending side walls 238 which flare outwardly to form lips 240. The cover member 236 is superposed upon the lips 240.

In FIG. 7 is illustrated the shrinkage in both the lip 240 and the cover member 236 during the sealing operation.

In FIG. 8 is illustrated the beading effect which is produced in the sealed container. It will be observed that the edge of the lip 240 now overlaps the top surface of the cover 236, while the lower surface of the lip has been drawn inwardly to form a downwardly depending bead 242.

This shrinkage and resultant bead formation is best delineated in FIGS. 10 and 11.

FIGS. 12 and 13 are fragmentary sectional views of a container 234' and related cover 236' of a modified type prior to and following sealing, respectively.

It will be observed that while side walls 238' of the container 234' flare outwardly to form lips 240', the said lips do not form a bead similar to bead 242 of container 234. This being true due to the inherent properties of the material of container 234' in resisting structural change upon the application of heat and pressure.

Due to the aforementioned properties, the cover 236' is welded to the lips 240' in the sealing operation shown in FIG. 13, all without change in the structural configuration of said lips 240' and cover 236'.

From the foregoing it will be readily observable that my novel apparatus may be used in the heat sealing of various types of synthetic thermoplastic materials.

The invention is not restricted to said embodiment and same is not intended to be exhaustive of, nor limiting of, the spirit or scope hereof. That is, the precise construction of the figures of the drawing need not be slavishly followed as, of course, the apparatus may have to be adapted or modified in accordance with the use to which it is to be put.

I do not thereby intend to limit the invention to the specific form disclosed, but rather intend to embrace herein all modifications, variations, alternative constructions, and equivalents falling within the spirit and scope of the invention and within the meaning and purview and range of equivalency of this disclosure.

I wish it understood that the objects of the invention are susceptible of attainment by use of constructions different in certain respects from that disclosed, minor changes and variations in the size, shape, thickness, form and variations in size, shape, thickness, form, proportion, dimensions, integration, cooperation of material and/or type of subassembly and accessory utilized in the invention being previously reverted to, all without departing from the underlying principles, scope and spirit of the appended claim.

It is premised, however, that such adaptations and/or modifications should be and are intended to be comprehended within the meaning and range of equivalence of the below subjoined claim there being no intent to have this invention limited to or circumscribed by any specific details.

All of this will be obvious to those skilled in the art to which the invention pertains, who will understand that same may be incorporated in any of several different constructions.

Without further analysis, the foregoing is intended to so fully reveal the gist of my invention and its construction and operation that others can, by applying current knowledge, readily adapt it for various applications without omitting features which from the standpoint of prior art, fairly constitute essential characteristics of its generic and/or specific aspects. The substitution of equivalents and other changes, modifications and alterations as circumstances may suggest or render expedient, are contemplated since the invention is susceptible of such without departing from its real spirit or underlying principles. Stated otherwise, it is not desired to limit this invention to the exact construction shown and described as the objects hereof may be attained by the use of constructions different in certain respects from that disclosed.

The invention is claimed, broadly as well as specifically, as indicated in the appended claim, and same are desired to include within the scope thereof all of said suitable variations, modifications and equivalents by which substantially the results of the invention may be obtained through the use of substantially the same or equivalent devices or means. Accordingly, limitation hereof should only be made as determined by a proper interpretation of the subjoined claim.

The protection which is sought for this invention is covered by the language of the specification and the spirit represented thereby and same is limited only by the prior art and the scope of the appended claim.

What is claimed as new and useful is:

In a machine for forming by heat and pressure a sealed package from a plastic container having a plastic cover disposed thereon including, a pair of vertically opposed electrically heated sealing elements, hydraulic means for reciprocating one of the sealing elements into and out of sealing engagement with the other of the sealing elements, platform means integral with and sleeved by said movable sealing element for supporting said plastic container and its related cover and for guiding said movable sealing element into sealing position relative to the other of said sealing elements, complemental raised surfaces on each of said sealing elements providing contoured faces for engagement with overlapping portions of the container and its related cover disposed therebetween, electrically actuated valve means for controlling the pressure delivered by said hydraulic means to said movable sealing element, an independently controllable dwell time control device adapted to arrest said movable sealing element whereby said raised surfaces of each said sealing element are in sealing position for an interval according to a predetermined setting, electrically controlled timing elements operable in conjunction with said hydraulic means adapted to retract the reciprocable sealing element from said sealing position at the expiration of a predetermined time setting for the release of the sealed package therebetween.

References Cited in the file of this patent

UNITED STATES PATENTS

| | | |
|---|---|---|
| 2,363,704 | Stover | Nov. 28, 1944 |
| 2,405,675 | Southwich et al. | Aug. 12, 1946 |
| 2,412,924 | Stover | Dec. 17, 1946 |
| 2,638,964 | Andina | May 19, 1953 |
| 2,647,557 | Selvin | Aug. 4, 1953 |
| 2,686,552 | Falher | Aug. 17, 1954 |